United States Patent [19]
Bentham

[11] Patent Number: 4,623,493
[45] Date of Patent: Nov. 18, 1986

[54] GAS/LIQUID CONTACTING APPARATUS

[75] Inventor: Jeremy B. Bentham, The Hague, Netherlands

[73] Assignee: Shell Oil Company, Houston, Tex.

[21] Appl. No.: 735,509

[22] Filed: May 20, 1985

[30] Foreign Application Priority Data

May 24, 1984 [GB] United Kingdom ............ 8413336

[51] Int. Cl.$^4$ ............................................. B01F 3/04
[52] U.S. Cl. ................................. 261/109; 202/158; 261/110; 261/113
[58] Field of Search ........... 261/109, 110, 113, 114 R, 261/114 A; 202/158

[56] References Cited

U.S. PATENT DOCUMENTS

| 2,010,010 | 8/1935 | Chillas, Jr. .................. 261/114 R |
| 2,693,949 | 11/1954 | Huggins ....................... 261/114 R |
| 2,767,967 | 10/1956 | Hutchinson .................. 261/113 |
| 3,018,094 | 1/1962 | Mikkelson .................... 261/113 |
| 3,070,360 | 12/1962 | Rafferty et al. ............... 261/113 |
| 3,273,872 | 9/1966 | Eckert ......................... 261/110 X |
| 4,171,333 | 10/1979 | Moore .......................... 261/113 X |

FOREIGN PATENT DOCUMENTS

| 92262 | 10/1983 | European Pat. Off. ........ 261/114 R |
| 509927 | 10/1930 | Fed. Rep. of Germany ...... 261/113 |
| 633433 | 7/1936 | Fed. Rep. of Germany ...... 261/113 |
| 869507 | 2/1942 | France ........................... 261/114 F |
| 233878 | 5/1925 | United Kingdom ............. 261/113 |

Primary Examiner—Richard L. Chiesa

[57] ABSTRACT

Gas/liquid contacting apparatus comprising a normally substantially vertically extending column enclosing a plurality of substantially horizontal gas/liquid guiding units vertically spaced apart from one another and extending over substantially the cross section of the column. Each gas/liquid guiding unit comprising a plurality of alternating upwardly converging gas passages and downwardly converging liquid passages, the gas passages and the liquid passages alternating in vertical direction. The liquid passages have open upper ends, and are provided with bottomwalls and with liquid discharge openings at or near said bottomwalls. Each upwardly converging gas passage is provided with an open lower end and terminates at its upper end in a plurality of substantially horizontal, parallel walls having a length increasing in downward direction and forming a plurality of substantially horizontal, constricted gas outlets. The gas outlets direct the high velocity gas streams substantially horizontally towards liquid curtains coming substantially vertically from the lower end of a next upper liquid passage and substantially impinging on the walls forming said gas outlets.

5 Claims, 3 Drawing Figures

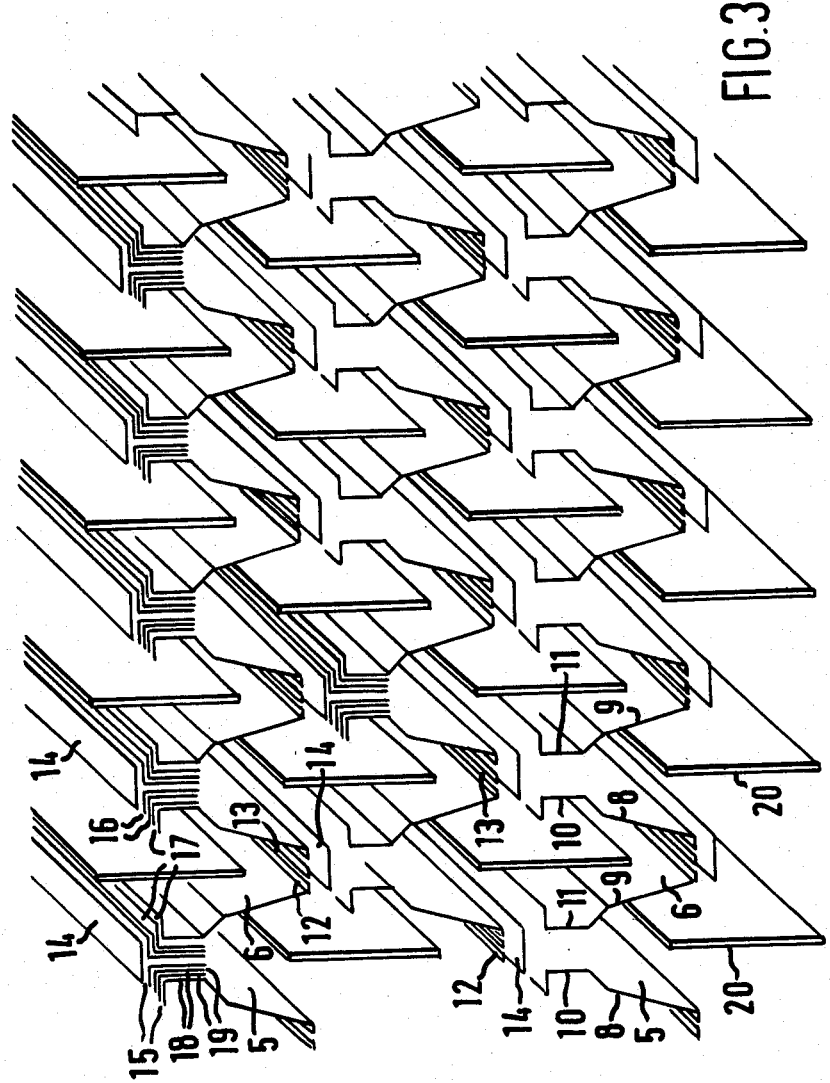

GAS/LIQUID CONTACTING APPARATUS

BACKGROUND OF THE INVENTION

The present invention relates to a gas/liquid contacting apparatus for the exchange of matter between a gas phase and a liquid phase and more in particular, to a column in which gas and liquid are caused to flow countercurrently.

Gas/liquid contacting columns are widely applied in the industry for a large variety of processing operations, such as for example, distillation, absorption, stripping and evaporation. The columns which are most commonly used for gas/liquid contact are the so-called plate columns and the so-called packed columns. Generally the plate columns are of the cross-flow type, wherein the columns are provided with trays having openings for ascending gas and one or more downcomers for descending liquid. Packed columns for gas/liquid contact, being used extensively for absorption operations, are columns filled with randomly oriented packing material or with structured packing material. The total open area available for ascending gas is in packed columns very high compared to plate columns. It will therefore be understood that packed columns can be operated at far higher gas loads than plate columns. A disadvantage of packed columns is however, the operating range for the liquid load. Low liquid rates lead to incomplete wetting of the column packings thus a decreasing contacting efficiency. On the other hand, at higher liquid rates the effective open cross sectional area available for the passage of gas becomes smaller because of the presence of liquid, and part of the momentum of the gas stream is used to support an increasing quantity of liquid in the column, resulting in an increase of the liquid hold-up and unstable operation.

Plate columns of the cross flow type can be more readily designed for high liquid loads than packed columns. The minimum liquid load which is admissible depends on the minimum liquid velocity through the downcomer liquid discharge openings or the minimum load required to keep sufficient liquid on the contact trays. The maximum allowable liquid load can be increased by increasing the length of the downcomer weirs on the trays, for example, the length of the downcomers and/or the number of downcomers may be enlarged, all of which measures mean an increase of the total tray area occupied by downcomers. Increase of the total downcomer area, however, results in a decrease of the total free area of the trays, i.e., those parts of the trays above which gas and liquid are contacted with one another and which trays are provided with apertures for ascending gas. Reduction of the total free area of a contact tray, however, results in a reduction of the total area available for the passage of ascending gas. At a given gas load, reduction of the total free area of the contact trays constitutes increase of the gas velocity upon passage through the contact tray apertures, which in its turn might give rise to flooding of the column. Flooding of the column is the phenomenon that occurs when the spaces between adjacent contact trays are completely filled with a froth of liquid and gas. From the above it will be clear that although the liquid capacity of plate columns may be relatively easily increased by enlargement of the downcomer area, such an increase will adversely affect the maximum gas load. With respect to this statement it should be understood that the spacing and the size of the apertures in contact trays for ascending gas can only be varied within rather narrow limits. Very small apertures may lead to punching difficulties and possibilities of fouling in dirty service, while large holes may lead to weeping and poor dispersion. The spacing of the apertures usually ranges from 2.5 to 4 times the diameter of the apertures. Closer spacings lead to excessive weeping and wider spacings lead to excessive pressure drop and to entrainment due to high apertures velocities.

BRIEF SUMMARY OF THE INVENTION

The object of the present invention is to provide a gas/liquid contacting apparatus having a larger liquid capacity than columns provided with commercially available packing material and having an improved gas capacity compared to columns of the conventional plate type.

The gas/liquid contacting apparatus according to the invention thereto comprises a normally substantially vertically extending column enclosing a plurality of substantially horizontal gas/liquid guiding units vertically spaced apart from one another and extending over substantially the cross section of the vessel. Each gas/liquid guiding unit comprises a plurality of alternating upwardly converging gas passages and downwardly converging liquid passages. The gas passages and the liquid passages alternate in a vertical direction and are substantially coaxially arranged with respect to each other. The liquid passages have open upper ends and are provided with bottomwalls and with liquid discharge openings at or near said bottomwalls. Each upwardly converging gas passage is provided with an open lower end and terminate at their upper end in a plurality of substantially horizontal, parallel walls having a length increasing in downward direction. The horizontal, parallel walls form a plurality of substantially horizontal, constricted gas outlets for directing high velocity gas streams substantially horizontally towards liquid curtains coming substantially vertically from the lower end of a next upper liquid passage and substantially impinging on the walls forming said gas outlets.

During operation of the above device according to the invention gas and liquid is caused to flow countercurrently through a gas/liquid contacting column, while the gas coming from below enters the gas outlets of the gas passages which causes an abrupt increase of the gas velocity. The gas leaving a gas passage as a plurality of substantially horizontal high velocity gas streams impinge against the liquid curtains from the liquid discharge openings of a next upper liquid passage. The liquid curtains from a next upper liquid passage are predispersed by impingement on the walls forming the gas outlet conduits and are further dispersed and intensively mixed with the high velocity gas streams. Since the gas BKAE8513604 is substantially horizontally directed upon contact with the liquid, the risk of entrainment of liquid with gas passing after contact in vertical direction to the gas passages is very low. Moreover, the gas velocity after contact is substantially reduced and is only moderately increased in the gas passages due to the converging shape of said passages. Liquid, if any, entrained with the gas entering into the gas passages can therefore quite easily escape from the upwardly moving gas streams by gravity flow. After the gas/liquid contact, the liquid will flow in downward direction to the liquid passages and is allowed to settle on the bottomwalls of the passages prior to being discharged via the liquid discharge openings to a next lower contact stage.

BRIEF DESCRIPTION OF THE DRAWING

The invention will now be described by way of example only with reference to the accompanying drawing, in which:

FIG. 3 shows an isometric view of the guiding units shown in FIG. 1 on a larger scale than the scale of FIG. 1.

DESCRIPTION OF PREFERRED EMBODIMENT

Figure 1:
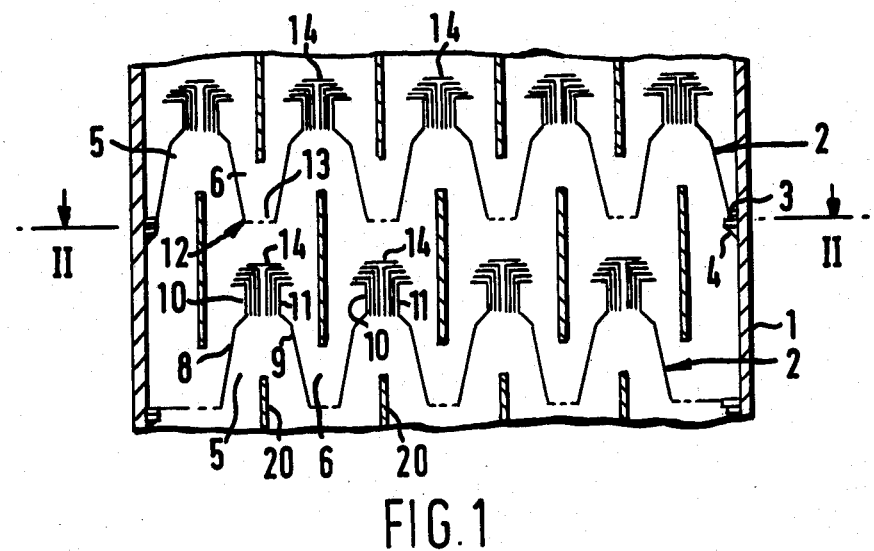
FIG. 1 is a vertical sectional view of an intermediate part of a gas/liquid contacting column provided with gas/liquid guiding units according to the invention.
Figure 2:
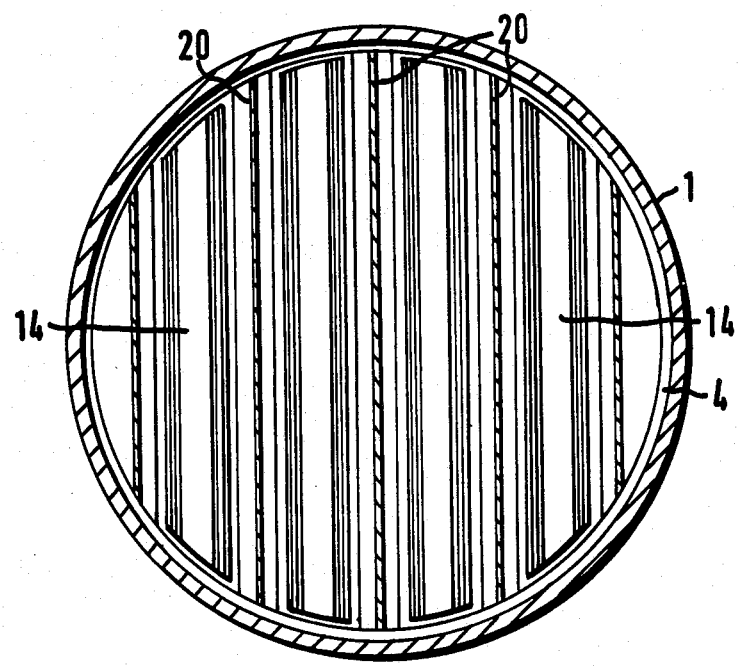
FIG. 2 is a transverse section taken at the lines II—II in FIG. 1.

In FIG. 1 there is shown an intermediate part of a substantially vertically arranged column 1 of substantially circular cross section (as shown in FIG. 2), which column is provided at its top and bottom with inlets and outlets (not shown) for liquid and gas also if desired with a liquid distributor may be provided in addition, a condenser, a reboiler (also not shown) and/or other associated devices in a known manner, for causing gas to ascend and liquid to descend through the column.

The interior of the column 1 is provided with a plurality of substantially horizontal gas/liquid guiding units 2 arranged one above the other at suitable intervals and extending over substantially the whole cross-section of the column. The outer periphery of said guiding units is provided with a ring 3 mounted on a support ring 4 connected to the inner surface of the sidewall of column 1. The guiding units 2 each consist of a plurality of alternating elongated upwardly converging gas passages 5 and downwardly converging liquid passages 6. The gas passages 5 and liquid passages 6 are laterally bounded by common inclined sidewalls 8 and 9 and common substantially vertical sidewalls 10 and 11, connected to sidewalls 8 and 9, respectively. The vertically spaced guiding units 2 are so positioned with respect to one another that in vertical direction the gas passages and the liquid passages alternate with one another. The liquid passages 6 are bounded at their lower ends by substantially horizontal bottomwalls 12 provided with slit-shaped liquid discharge openings 13 running along the length of said bottomwalls 12. The openings 13 are so dimensioned and formed that during operation of the column a liquid layer is formed on the walls 12 preventing the entry of gas through said openings 13 in upward direction. The gas passages 5 are bounded in upward direction by substantially horizontal topwalls 14 being substantially aligned with the bottomwalls 12 of next upper liquid passages 6. The width of the topwalls 14 substantially corresponds with the width of the bottomwalls 12. The distance between the topwalls 14 and the bottomwalls 12 should be chosen sufficiently large to prevent hindrance of the outflow of liquid through the liquid discharge openings 13 during operation of the column.

The gas passages 5 are provided with a plurality of constricted gas outlets 15 arranged above one another as shown in FIG. 3. These gas outlets are formed by substantially horizontal walls 16 having such a length that the outer ends 17 of the gas outlets 15 are arranged in an imaginary plane inclined with respect to the vertical so that the outer ends of lower gas outlets 15 are positioned more laterally outwardly than the outer ends of the upper gas outlets. To ensure a substantially flat velocity pattern of the gas flows over each of the outlets 15, the upper constricted parts of the gas passages 15 bounded by the vertically extending walls 10 and 11 are split up into a plurality of outlet passages 18 by vertical parallel walls 19, each outlet passage forming a fluid communication between the lower part of a passage 5 and one gas outlet 15. The guiding units shown in FIG. 3 are further provided with vertically extending splashing baffles 20 substantially centrally arranged between opposite gas outlets 15 of adjacent gas passages 5.

The operation of the apparatus shown in the figures is as follows. Liquid collected in the lower parts of the liquid passages 6 of an upper gas/liquid guiding unit leaves the liquid passages 6 through the liquid discharge openings 13 in the form of a plurality of liquid curtains. The liquid curtains impinge on the outer ends of the walls 14 and 16 forming the gas outlets 15, thereby causing a breakdown of the liquid curtains into separate droplets with a large total surface area. The flow of gas fed to the gas passages 5 is split up into a plurality of high velocity streams which pass through the gas outlets 15. These high velocity gas streams leaving the gas outlets 15 in a substantially horizontal direction cause an intensive mixing with the liquid droplets passing along the gas outlets 15. Since the gas streams from the gas outlets 15 are directed horizontally the velocity of the gas may be very high without risk of liquid entrainment as compared to contact of liquid with vertically outflowing gas. The higher the gas velocity produces more intimate mixing of liquid and gas. The mixing intensity is of paramount importance for the mass transfer efficiency between the gas and liquid phase. Since the impingement of the liquid against the horizontal walls 16 already caused dispersion of the liquid, the momentum of the outflowing gas is most advantageously used for mixing with the liquid droplets formed after impingement of the liquid on the walls 16. After the gas/liquid contact the gas flows in upward direction to the gas passages of a next upper guiding unit. On account of the relatively wide inlet openings of said gas passages, the gas velocity is considerably reduced, so that liquid droplets in the gas flow may easily escape by gravity flow. The splashing baffles 20 form a further aid for liquid separation, since the impingement of the gas/liquid mixture upon said baffles 20 cause a sudden velocity reduction of the liquid particles, so that the liquid will form a film along the baffles and run towards the next lower liquid passage.

In the embodiment shown in detail in FIG. 3 the liquid passages and the gas passages are of substantially equal size. It should, however, be noted that the size of the liquid passages and that of the gas passages may be largely varied and may be easily adapted to the desired gas and liquid load in the proposed apparatus. The effective contact area for gas and liquid is in the proposed apparatus formed by the space between the gas outlets of opposite gas passages. Since the space is also available for entry of liquid into the liquid passages, the distance between opposite gas outlets should preferably be chosen rather large. As already discussed in the above a wide entry of the gas passages is convenient for maintaining the gas velocity at a level at which the risk of liquid entrainment is substantially negligible. On the other hand the lower ends of the liquid passages should preferably be chosen relatively small to provide a sufficient liquid seal against upward flowing gas at low liquid load operations.

It should further be noted that instead of elongated liquid discharge openings running along the length of the liquid passages, transversely arranged liquid discharge openings may be chosen. Transverse liquid discharge openings may be preferred from the point of view of generating a proper liquid seal of said openings during operation. Further, such transversely arranged liquid discharge openings may be preferred if the breadth of the bottomwalls of the liquid passages and that of the topwalls of the gas passages are relatively small.

Finally it is remarked that although in the figures shown the liquid and the gas passages are parallel to one another and run from edge to edge of a guiding unit, the present invention is not restricted to such a configuration of the liquid and gas passages. Although less preferred, the liquid and gas passages may, for example, be arranged in the form of concentric annuli.

What is claimed is:

1. A gas liquid contacting apparatus including a substantially vertical housing having gas liquid guiding units extending over substantially the total cross section of said housing, each of said gas liquid guiding units comprising:

gas passage means forming an upwardly converging gas passage having an elongated form;

liquid passage means forming a downwardly converging liquid passage having an elongated form, said liquid passage means being positioned above and aligned with said elongated form of said gas passage means, said liquid passage means having an open upper end and a bottom wall, said bottom wall having liquid discharge openings; and a plurality of substantially horizontal parallel spaced walls mounted adjacent the upper end of said gas passage means, said walls forming a plurality of horizontal constricted gas outlets for directing horizontal gas streams towards the liquid falling from the liquid passage means positioned above said gas passage means, each succeeding one of said walls increasing in length in a downward direction, said gas passage means includes a plurality of L-shaped members mounted adjacent the upper end of said gas passage means, said L-shaped members being disposed so that the legs thereof form a plurality of vertical passages that extend downwardly into said gas passage means and the bases thereof form said horizontal parallel walls.

2. The apparatus of claim 1 wherein said gas passage means and said liquid passage means have a common inclined side wall.

3. The apparatus of claim 2 wherein said gas passage means and said liquid passage means alternate in a horizontal direction and are at least partially formed by parallel walls.

4. The apparatus of claim 3 wherein said gas passage means and said liquid passage means extend from one sidewall of said housing to the opposite sidewall of the housing.

5. A gas liquid contacting apparatus including a substantially vertical housing having gas liquid guiding units extending over substantially the total cross section of said housing, each of said gas liquid guiding units comprising:

gas passage means forming an upwardly converging gas passage;

liquid passage means forming a downwardly converging liquid passage, said liquid passage means being positioned above and aligned with said gas passage means, said liquid passage means having an open upper end and a bottom wall, said bottom wall having liquid discharge openings, said gas passage means and said liquid passage means having a common inclined sidewall, said gas passage means and said liquid passage means alternating in a horizontal direction, said gas passage means and said liquid passage means at least partially formed by parallel walls, said gas passage means and said liquid passage means having an elongated form and extending from one sidewall of said housing to the opposite sidewall of said housing;

a plurality of substantially horizontal parallel spaced walls mounted adjacent the upper end of said gas passage means, said walls forming a plurality of horizontal constricted gas outlets for directing horizontal gas streams towards the liquid falling from the liquid passage means positioned above said gas passage means, each succeeding one of said walls increasing in length in a downward direction; and a plurality of splashing baffles extending vertically and being substantially centrally arranged between opposite gas outlets of adjacent gas passage means, said splashing baffles being positioned directly above said liquid passage means.

* * * * *